United States Patent
Ling et al.

(10) Patent No.: US 10,939,063 B2
(45) Date of Patent: Mar. 2, 2021

(54) METHOD AND CIRCUIT FOR SIGNAL COLLECTION OF IMAGE SENSOR

(71) Applicant: SHANGHAI OXI TECHNOLOGY CO., LTD, Shanghai (CN)

(72) Inventors: Yan Ling, Shanghai (CN); Hong Zhu, Shanghai (CN)

(73) Assignee: SHANGHAI OXI TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 15/733,328

(22) PCT Filed: Dec. 19, 2018

(86) PCT No.: PCT/CN2018/121977
§ 371 (c)(1),
(2) Date: Jun. 29, 2020

(87) PCT Pub. No.: WO2020/124409
PCT Pub. Date: Jun. 25, 2020

(65) Prior Publication Data
US 2020/0389612 A1    Dec. 10, 2020

(51) Int. Cl.
*H04N 5/378* (2011.01)
*H04N 5/359* (2011.01)
*H04N 5/341* (2011.01)

(52) U.S. Cl.
CPC .............. *H04N 5/378* (2013.01); *H04N 5/341* (2013.01); *H04N 5/359* (2013.01)

(58) Field of Classification Search
CPC ......... H04N 5/341; H04N 5/359; H04N 5/378
(Continued)

(56) References Cited

U.S. PATENT DOCUMENTS

2013/0222584 A1* 8/2013 Aoki ................... H04N 5/335
                                                  348/143
2020/0314363 A1* 10/2020 Yang ................... H04N 5/347

FOREIGN PATENT DOCUMENTS

CN    106231210 A    11/2017
CN    106308834 A    3/2018
(Continued)

OTHER PUBLICATIONS

International Search Report and Written Opinion from PCT/CN2018/121977 dated Sep. 20, 2019 (with English translation of Written Opinion).

*Primary Examiner* — Kevin K Pyo
(74) *Attorney, Agent, or Firm* — Adsero IP

(57) ABSTRACT

The present disclosure provides a method and a circuit for signal collection of an image sensor. The image sensor includes a plurality of pixels arranged in an array, and each of the plurality of pixels include a photodiode. The method for signal collection includes: performing signal collection row by row on the plurality of pixels in each signal collection period, wherein the signal collection period comprises at least one reset frame and at least one clear frame; applying a forward bias voltage to the photodiode of each of the plurality of pixels being collected in each reset frame; and applying a reverse bias voltage to the photodiode of each of the plurality of pixels being collected in each clear frame. The solution provided by the present disclosure can ensure a better clearing effect and eliminate the impact of ambient light on imaging, while shortening the signal collection period.

11 Claims, 5 Drawing Sheets

(58) Field of Classification Search
USPC .................................................... 250/208.1
See application file for complete search history.

(56) References Cited

FOREIGN PATENT DOCUMENTS

| WO | WO 2013/014502 | 1/2013 |
| WO | WO 2017/149433 | 9/2017 |

* cited by examiner

US 10,939,063 B2

METHOD AND CIRCUIT FOR SIGNAL COLLECTION OF IMAGE SENSOR

CROSS-REFERENCE TO RELATED APPLICATIONS

This application is a 35 U.S.C. § 371 national phase application of PCT/CN2018/121977, filed on Dec. 19, 2018, entitled "Method and Circuit for Signal Collection of Image Sensor", which is incorporated herein by reference in its entirety.

TECHNICAL FIELD

The present disclosure relates to the technical field of image sensors, and more particularly to a method and a circuit for signal collection of an image sensor.

BACKGROUND

An image sensor is a sensor device which applies a photoelectric conversion function of a photoelectric device to convert a light image on a photosensitive surface into an electrical signal in a proportional relationship with the light image.

For example, an optical fingerprint sensor generally includes a pixel array, a control line (also referred to as a driving line), a scanning line (also referred to as a signal readout line), and so on. Each pixel in the pixel array has a photoelectric device to realize the conversion from a light signal to the electrical signal.

At present, existing photoelectric device applied in the image sensor is usually a photodiode. However, due to the influence of various factors such as dark current of the photodiode itself and ambient light of an environment where the image sensor locates, useless charges exist on each pixel before the image sensor performs signal collection. Thus, each pixel of the image sensor needs to be cleared before actual signal collection.

Therefore, there is a need for a method for signal collection to improve processing logic in a clearing operation of the pixel.

SUMMARY

Embodiments of the present disclosure provide an efficient method for signal collection to achieve a better clearing effect while shortening a signal collection period.

An embodiment of the present disclosure provides a method for signal collection of an image sensor. The image sensor includes a plurality of pixels arranged in an array, and each of the plurality of pixels includes a photodiode. The method for signal collection includes: performing signal collection row by row on the plurality of pixels in each signal collection period, wherein the signal collection period includes at least one reset frame and at least one clear frame; applying a forward bias voltage to the photodiode of each of the plurality of pixels being collected in each of the at least one reset frame; and applying a reverse bias voltage to the photodiode of each of the plurality of pixels being collected in each of the at least one clear frame.

In some embodiment, in a same signal collection period, the reverse bias voltage applied to the photodiode in different clear frames has a same or different absolute values.

In some embodiment, the at least one clear frame includes at least one first clear frame and at least one second clear frame, and an absolute value of the reverse bias voltage applied to the photodiode in each of the at least one first clear frame is greater than that of the reverse bias voltage applied to the photodiode in each of the at least one second clear frame.

In some embodiment, the at least one first clear frame is prior to the at least one second clear frame in timing sequence in the same signal collection period.

In some embodiment, the absolute value of the reverse bias voltage applied to the photodiode in each of the at least one first clear frame is 1 to 3 times of the absolute value of the reverse bias voltage applied to the photodiode in each of the at least one second clear frame.

In some embodiment, the signal collection period further includes: a signal readout frame, wherein a reverse bias voltage is applied to the photodiode of each of the plurality of pixels being collected in the signal readout frame.

In some embodiment, the method for signal collection further includes: performing signal collection on the plurality of pixels row by row in the signal readout frame, and storing a collected signal value of each photodiode.

In some embodiment, an absolute value of the reverse bias voltage applied to the photodiode in the signal readout frame is not greater than the absolute value of the reverse bias voltage applied to the photodiode in the at least one clear frame.

In some embodiment, performing signal collection row by row on the plurality of pixels in each signal collection period includes: discarding a signal value of each photodiode collected in the at least one reset frame and in the at least one clear frame in each signal collection period.

In some embodiment, one end of each photodiode is coupled with a switching device, and the other end of each photodiode is commonly coupled with a common electrode, wherein applying the forward bias voltage to the photodiode includes controlling a potential of the common electrode to be a positive potential, and applying the reverse bias voltage to the photodiode includes controlling the potential of the common electrode to be a negative potential.

Another embodiment of the present disclosure provides a circuit for signal collection of an image sensor. The image sensor includes a plurality of pixels arranged in an array, and a plurality of data lines and a plurality of scanning lines, wherein each of the plurality of pixels in each column is coupled with a same data line through a pixel switch, and a pixel switch coupled with each of the plurality of pixels in each row is coupled with the same scanning line. The circuit for signal collection includes: a scanning line control unit coupled with the plurality of scanning lines and configured to control the plurality of pixels to be switched on row by row in each signal collection period; a signal readout unit coupled with the plurality of data lines and configured to read an electrical signal of a pixel switched on through the data line in each signal collection period. The circuit for signal collection further includes: a bias voltage control unit coupled with the common electrode, and configured to apply the method for signal collection to apply a forward bias voltage or a reverse bias voltage to the photodiode of each of the plurality of pixels being collected.

Compared with the prior art, embodiments of the present disclosure have the following beneficial effects.

Embodiments of the present disclosure provide a method for signal collection of an image sensor. The image sensor includes a plurality of pixels arranged in an array, and each of the plurality of pixels includes a photodiode. The method for signal collection includes: performing signal collection row by row on the plurality of pixels in each signal collection period, wherein the signal collection period includes at least one reset frame and at least one clear frame; applying a forward bias voltage to the photodiode of each of the plurality of pixels being collected in each of the at least one reset frame; and applying a reverse bias voltage to the photodiode of each of the plurality of pixels being collected in each of the at least one clear frame.

Thus, the present disclosure can ensure a better clearing effect and eliminate the influence of ambient light on the imaging, as well as shortening the signal collection period. Specifically, in the reset frame, it amounts to an irradiation on each photodiode with strong light, so that an initial state of each photodiode can be adjusted uniformly through the reset frame, so as to eliminate the influence of historical light, ambient light and difference of each photodiode on residual charges. Further, with the clear frame, the charges generated by each photodiode in the reset frame can be effectively cleared. Thus, by the cooperation of the reset frame and the clear frame, the image collection accuracy of the image sensor can be improved, and the consistency of the image collected each time can be ensured.

Further, the at least one clear frame includes at least one first clear frame and at least one second clear frame, wherein an absolute value of the reverse bias voltage applied to the photodiode in each of the at least one first clear frame is greater than that of the reverse bias voltage applied to the photodiode in each of the at least one second clear frame. Therefore, with the first clear frame, a clearing speed can be increased, the signal collection period can be shortened, and an imaging speed of the image sensor can be increased. Further, with the second clear frame, it can be better ensured that the residual charges in the photodiode are released clearly.

DETAILED DESCRIPTION

As mentioned in the background, the processing logic in the clearing operation of the pixel in the existing method for signal collection needs to be improved.

Figure 1:
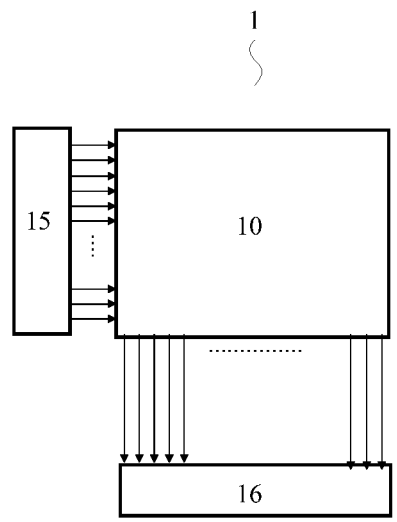
FIG. 1 is a schematic diagram of a circuit for signal collection of an image sensor of the prior art.
Figure 2:
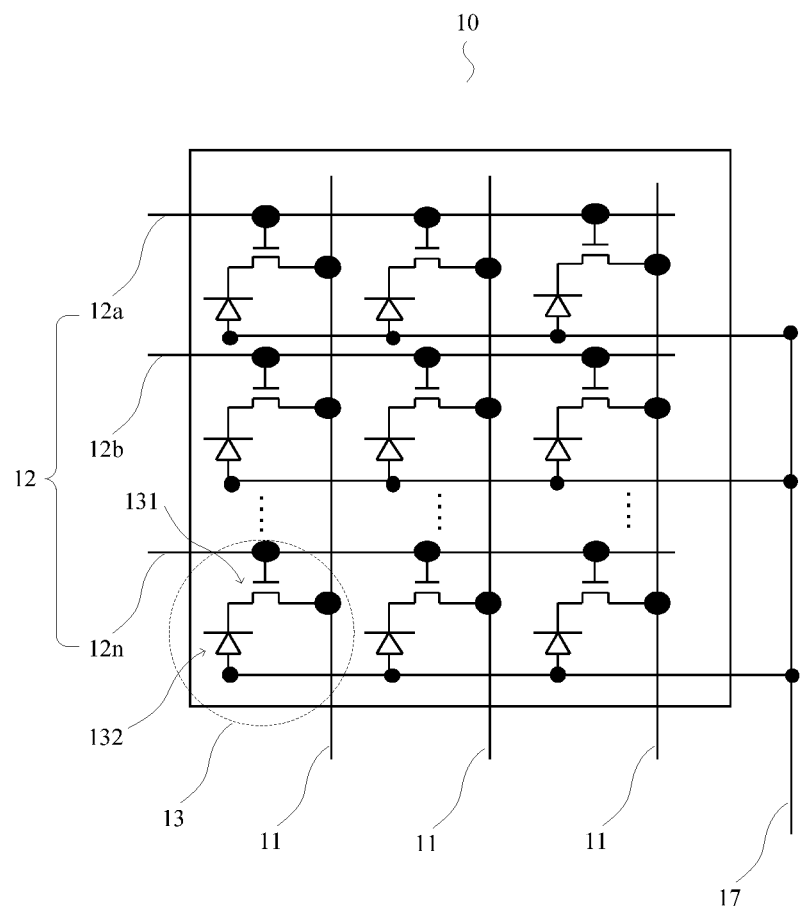
FIG. 2 is a schematic diagram of a pixel array in FIG. 1.

Specifically, referring to FIGS. 1 and 2, a circuit 1 for signal collection of an image sensor may include a pixel array 10, a scanning line control circuit 15, and a signal readout IC (referred to as ROIC) 16. The pixel array 10 includes a plurality of data lines 11 and a plurality of scanning lines 12. The data lines 11 and the scanning lines 12 define a plurality of grids arranged in an array, and an area where the grid is located is provided with a pixel 13 correspondingly.

Further, the pixel 13 includes at least one pixel switch 131 and at least one photosensitive device 132. The pixel switch 131 is generally a thin film transistor (TFT) device, and the photosensitive device 132 is used to collect an external input light signal and convert it into an electrical signal, and then store it in the corresponding pixel 13. FIG. 2 shows an example of the pixel 13, and each pixel 13 includes a pixel switch 131 and a photosensitive device 132.

In FIG. 2, the photosensitive device 132 is a photodiode. The photodiode includes a PIN junction amorphous silicon photodiode, a PN junction amorphous silicon photodiode, a PIN junction low-temperature polysilicon photodiode, a PN junction low-temperature polysilicon photodiode, a PIN junction organic photodiode, or a PN junction organic photodiode, etc.

Specifically, the scanning lines 12 can control switch-on and switch-off of the pixel switch 131 in each row, and the data lines 11 are coupled with drain (or source) of the pixel switch 131 in each column. One end of the photosensitive device 132 is coupled with the source (or the drain) of the pixel switch 131, and the other end of the photosensitive device 132 is commonly coupled with a common electrode 17.

During signal collection, a reverse bias voltage is applied to the photosensitive device 132 through the common electrode 17.

When the pixel switch 131 is switched on under the control of the coupled scanning line 12, the electrical signal in the photosensitive device 132 in a reverse bias voltage state can be transmitted to the coupled data line 11, and then transmitted to the signal readout IC 16 through the data line 11 for signal collection.

Further, the scanning line 12 is controlled by a peripheral drive circuit such as a scanning line control circuit 15 to realize the switch-on of the pixel switch 131 row by row, and the signal readout IC 16 reads out the signal of the pixel 13 switched on in each column.

Figure 3:
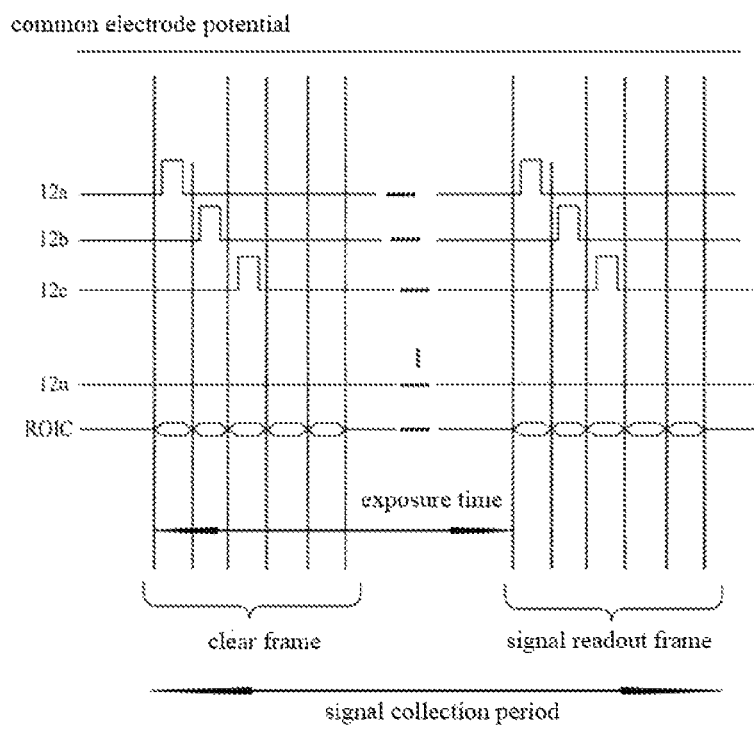
FIG. 3 shows a corresponding sequence diagram when the circuit for signal collection in FIG. 2 applies an existing method for signal collection.

FIG. 3 shows a corresponding driving sequence diagram when the circuit for signal collection in FIG. 2 applies the existing method for signal collection (the driving sequence includes the driving sequence of the scanning line 12 and the driving sequence of the signal readout IC 16). Each scanning line 12 (a scanning line 12c in FIG. 3 is not shown in FIG. 2) controls the pixel array 10 to be switched on row by row according to the sequence shown in FIG. 3. A driving time of a scanning line 12a is prior to a driving time of a scanning line 12b, and the driving time of the scanning line 12b is prior to a driving time of the scanning line 12c. The signal readout IC 16 collects the signal row by row correspondingly. Each channel of the signal readout IC 16 is coupled with the data line 11, so a potential value of each data line 11 is set by the signal readout IC 16. The potential value of the common electrode in FIG. 3 is the potential value applied to the common electrode 17 in FIG. 2. When each pixel is switched on, the difference between the potential value of the common electrode 17 and the potential value of each data line 11 determines a bias voltage value applied to each photodiode 132.

As shown in FIG. 2, in general application, a positive electrode of the photodiode 132 is coupled with the common electrode 17, and a negative electrode of the photodiode 132 is coupled with each pixel switch 131 respectively. When each row of pixels is switched on, if the potential value of the common electrode 17 is greater than the potential value of each data line 11, the photodiode 132 is applied with a positive voltage, that is, under a positive bias voltage. When each row of pixels is switched on, if the potential value of the common electrode 17 is lower than the potential value of each data line 11, the photodiode 132 is applied with a negative voltage, that is, under a reverse bias voltage.

In general design, in order to simplify the chip design and reduce circuit noise, the potential of each input channel of the signal readout IC 16 is set at a fixed value, so as to set the potential of the data line 11 at a fixed value. Therefore, it is necessary to determine the bias voltage value of the photodiode 132 in each pixel by setting the potential value of common electrode 17. That is, the bias voltage value of the photodiode 132 is equal to the potential value of the common electrode 17 minus the potential value of the data line 11.

In practical applications, due to leakage (dark current) of the photodiode and the incidence of ambient light, there will be useless charges on each pixel 13 (such as in the photosensitive device 132 and on the electrode) when the image sensor performs image collection. Therefore, each pixel 13 needs to be cleared before each signal collection.

Specifically, each signal collection period of the existing method for signal collection includes a clear frame and a signal readout frame. The timing sequences of the clear frame and the signal readout frame are exactly the same. The difference between them is that in the clear frame, after the signal of each pixel 13 is read out, the data will not be retained and directly discarded. Thus, by switching on the clear frame row by row, residual signal of the pixel 13 is read out to realize the clearing.

An interval between the times of switching on each row of pixels 13 in the clear frame and the signal readout frame is an exposure time of each row of pixels 13. It can be seen that start and end points of the exposure time of each row of pixels 13 are different, but the time length is the same.

Figure 4:
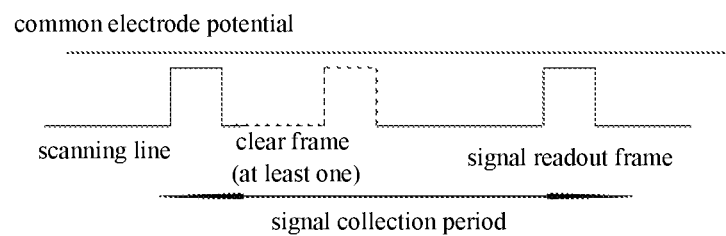
FIG. 4 is a sequence diagram of a method for signal collection of an image sensor of the prior art.

After analysis, it is found that when applying the method for signal collection shown in FIGS. 1 to 3, if there are many residual signals in the pixel 13, the photosensitive device 132 is in a saturated state. In FIG. 4, taking the scanning line 12a as an example, multiple continuous clear frames are needed to clearly release the charges in the row of photosensitive devices 132 coupled with the scanning line 12a, and then the true image collection operation is started in the signal readout frame.

In practical use, it is impossible to determine the intensity of ambient light in the environment where the image sensor is located, thus it is impossible to determine the specific number of the clear frames, or to ensure that the signals in each pixel 13 can be completely cleared.

If the number of the clear frames is set too small, the residual signals in pixel 13 will be uncertain. Specifically, if the ambient light is strong, there will be more residual charges in the photosensitive device 132, and if the ambient light is weak, there will be fewer residual charges in the photosensitive device 132.

More seriously, before the collection, if some pixels 13 are illuminated by strong light, more signals are remained, while some pixels 13 are illuminated by weak light, fewer signals are remained. In this way, if the number of the clear frames is set too small, the residual signals of each pixel 13 will be not uniform, which will seriously affect the final image effect.

Therefore, in order to ensure that the signals in the pixel 13 can be cleared regardless of the intensity of the ambient light, it is necessary to configure as many clear frames as possible, such as 50, in the existing signal collection period, so as to ensure that the charges in the photosensitive device 132 can be cleared as many as possible at any time (regardless of whether the ambient light is strong or weak), or the residual charges are fewer.

Due to the increase of the number of the clear frames, the signal collection period of the existing method for signal collection is longer.

In order to shorten the signal collection period and achieve a better cleaning effect, an embodiment of the present disclosure provides a method for signal collection of an image sensor. The image sensor includes a plurality of pixels arranged in an array, and each of the plurality of pixels includes a photodiode. The method for signal collection includes: performing signal collection row by row on the plurality of pixels in each signal collection period, wherein the signal collection period includes at least one reset frame and at least one clear frame; applying a forward bias voltage to the photodiode of each of the plurality of pixels being collected in each of the at least one reset frame; and applying a reverse bias voltage to the photodiode of each of the plurality of pixels being collected in each of the at least one clear frame.

Thus, the present disclosure can ensure a better clearing effect and eliminate the influence of ambient light on the imaging, while shortening the signal collection period. Specifically, in the reset frame, it can be equivalent to irradiating each photodiode with strong light, so that an initial state of each photodiode can be adjusted uniformly (that is, the signals are relatively uniform) through the reset frame, so as to eliminate the influence of historical light, ambient light and difference of each photodiode on residual charges. Further, with the clear frame, the charges generated by each photodiode in the reset frame can be effectively cleared (at least most of the charges are cleared). Thus, by the cooperation of the reset frame and the clear frame, the image collection accuracy of the image sensor can be improved, and the consistency of the image collected each time can be ensured.

In order to make above purposes, features and beneficial effects of the present disclosure more obvious and understandable, specific embodiments of the present disclosure will be described in detail below in combination with the attached drawings.

Figure 5:
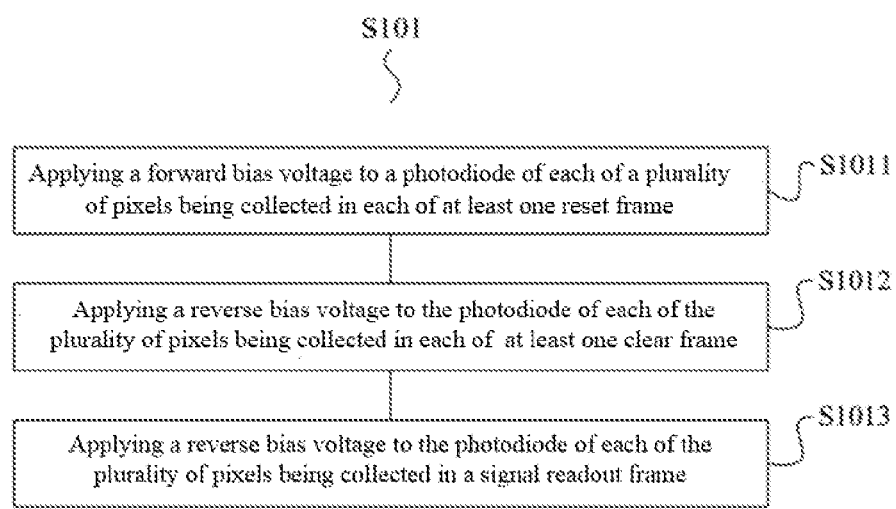
FIG. 5 is a flow chart of a method for signal collection of an image sensor according to an embodiment of the present disclosure.
Figure 6:
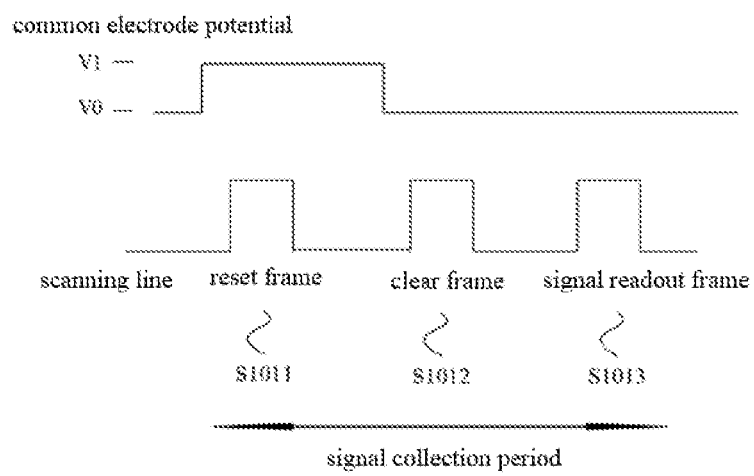
FIG. 6 is a sequence diagram corresponding to the method for signal collection shown in FIG. 5.

FIG. 5 is a flow chart of a method for signal collection of an image sensor according to an embodiment of the present disclosure, and FIG. 6 is a sequence diagram corresponding to the method for signal collection shown in FIG. 5.

Specifically, the image sensor may include a plurality of pixels arranged in an array, and reference may be made to the specific description of the pixel 13 in FIG. 2 for the specific structure of the plurality of pixels.

In some embodiments, the photosensitive device of the pixel is a photodiode. The photodiode includes a PIN junction amorphous silicon photodiode, a PN junction amorphous silicon photodiode, a PIN junction low-temperature polysilicon photodiode, a PN junction low-temperature polysilicon photodiode, a PIN junction organic photodiode, or a PN junction organic photodiode, etc.

In some embodiments, the image sensor may be an optical fingerprint sensor.

More specifically, the method for signal collection of the present embodiment can include the following steps:

S101, in each signal collection period, the signal collection is performed on the plurality of pixels row by row, and the signal collection period may include at least one reset frame and at least one clear frame, wherein S101 may include: S1011, a positive bias voltage is applied to the photodiode of each collected pixel in each reset frame; and S1012, a reverse bias voltage is applied to the photodiode of each collected pixel in each clear frame.

Further, the signal collection period may also include: a signal readout frame.

S101 may also include: S1013, a reverse bias voltage is applied to the photodiode of each collected pixel in the signal readout frame.

Further, for each scanning line, each signal collection period may include at least one reset frame, at least one clear frame, and one signal readout frame.

In some embodiments, the absolute value of the reverse bias voltage applied in S1012 may be equal to the absolute value of the reverse bias voltage applied in S1013.

As a variation, the absolute values of the reverse bias voltage applied in S1012 and S1013 may also be different.

In some embodiments, S101 may also include: in each signal collection period, retaining the collected signal value of each photodiode in the signal readout frame, and discarding the collected signal value of each photodiode in the at least one reset frame and at least one clear frame. That is, the signals collected in S1011 and S1012 will be discarded, and the signals collected in S1013 will be stored.

In some embodiments, in combination with FIGS. 6 and 2, taking the photosensitive device 132 as a photodiode for example, one end of each photodiode is coupled with a switch device (the pixel switch 131 shown in FIG. 2) respectively, and the other end of each photodiode is commonly coupled with the common electrode 17.

Further, applying the forward bias voltage to the photodiode in this embodiment includes controlling the potential of the common electrode 17 to be a positive potential, that is, setting the potential of the common electrode 17 to a potential value V1 (V1>0, and V1> the potential of the data line), wherein the data line may be the data line 11 shown in FIG. 2, so that the potential of the common electrode 17 is higher than the potential of the data line 11, so that the bias voltage of the photodiode is a positive bias voltage (positive voltage).

Further, applying the reverse bias voltage to the photodiode in this embodiment includes controlling the potential of the common electrode 17 to be a negative potential, that is, setting the potential of the common electrode 17 to a potential value V0 (V0<0, and V0< the potential of the data line 11), so that the potential of the common electrode 17 is lower than the potential of the data line 11, so that the bias voltage of the photodiode is a reverse bias voltage (negative voltage).

Thus, the present disclosure can ensure a better clearing effect and eliminate the influence of ambient light on the imaging, while shortening the signal collection period. Specifically, in the reset frame, it can be equivalent to irradiating each photodiode with strong light, so that an initial state of each photodiode can be adjusted uniformly through the reset frame, so as to eliminate the influence of historical light, ambient light and difference of each photodiode on residual charges. Further, with the clear frame, the charges generated by each photodiode in the reset frame can be effectively cleared (at least most of the charges are cleared). Thus, by the cooperation of the reset frame and the clear frame, the image collection accuracy of the image sensor can be improved, and the consistency of the image collected each time can be ensured.

In some embodiments, when there are multiple clear frames, the potential value V0 of the reverse bias voltage applied to the photodiode in different clear frames in the same signal collection period may be the same. In some embodiments, the absolute value of the reverse bias voltage (|V0-data line potential|) applied to the photodiode in each clear frame may be equal to the absolute value of the reverse bias voltage (|V0-data line potential|) applied to the photodiode in the signal readout frame.

In a variation of this embodiment, when there are multiple clear frames, the absolute values of the reverse bias voltage applied to the photodiode in different clear frames in the same signal collection period may be different.

Figure 7:
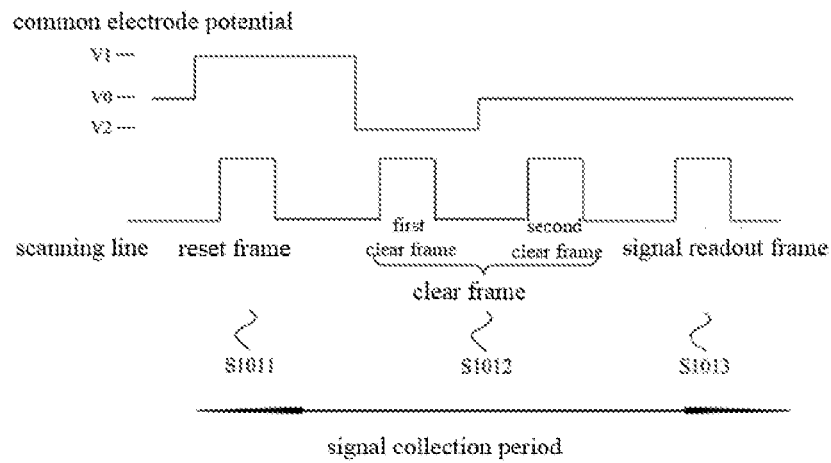
FIG. 7 is another sequence diagram corresponding to the method for signal collection shown in FIG. 5.

Specifically, referring to FIG. 7, the at least one clear frame may include at least one first clear frame and at least one second clear frame, wherein the potential of the common electrode 17 is set to a potential value V2 (V2< the potential of the data line 11) in each first clear frame, and the potential of the common electrode 17 is set to a potential value V0 (V2<V0< the potential of the data line 11) in each second clear frame. Therefore, the absolute value of the reverse bias voltage (|V2-data line potential|) applied to the photodiode in each first clear frame is greater than the absolute value of the reverse bias voltage (|V0-data line potential|) applied to the photodiode in each second clear frame.

Therefore, by applying a reverse bias voltage having a greater absolute value in the first clear frame than that in the normal signal collection, a large amount of charges generated by the photodiode in the reset frame can be quickly cleared, thereby further shortening the signal collection period and increasing the imaging speed of the image sensor.

Further, with the second clear frame, the residual charges in the photodiode may be released by the maximum extent.

Further, multiple first clear frames are provided, so as to obtain a better clearing effect in a short time.

In some embodiments, the at least one first clear frame may be prior to the at least one second clear frame in timing sequence in the same signal collection period.

In some embodiments, the absolute value of the reverse bias voltage (|V2-data line potential|) applied to the photodiode in each first clear frame may be 1 to 3 times of the absolute value of the reverse bias voltage (|V0-data line potential|) applied to the photodiode in each second clear frame. Therefore, the first clear frame may also be a strong clear frame, and the second clear frame may be similar to the clear frame in the prior art.

In some embodiments, the absolute value of the reverse bias voltage applied to the photodiode in the signal readout frame is not greater than the absolute value of the reverse bias voltage applied to the photodiode in the clear frame.

For example, the absolute value of the reverse bias voltage (|V0-data line potential|) applied to the photodiode in the signal readout frame can be equal to the absolute value of the reverse bias voltage (|V0-data line potential|) applied to the photodiode in the second clear frame, and less than the absolute value of the reverse bias voltage (|V2-data line potential|) applied to the photodiode in the first clear frame.

Figure 8:
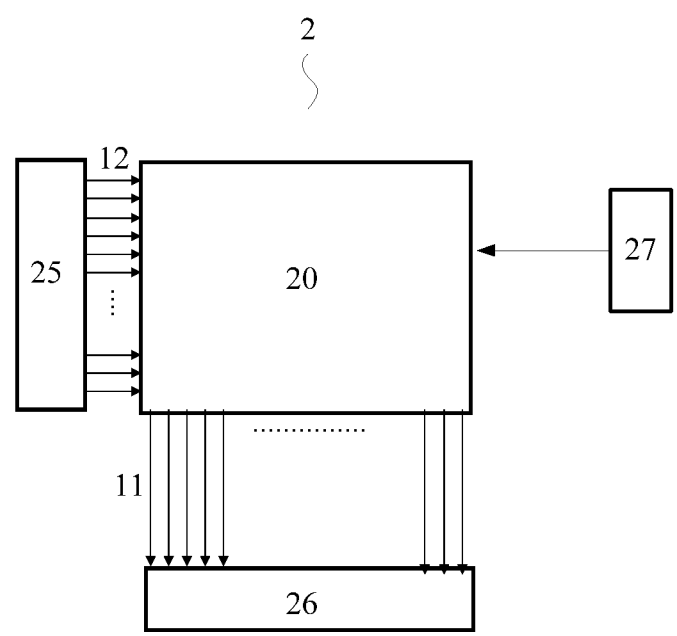
FIG. 8 is a schematic diagram of a circuit for signal collection of an image sensor according to an embodiment of the present disclosure.

FIG. 8 is a schematic diagram of a circuit for signal collection of an image sensor according to an embodiment of the present disclosure.

Specifically, for the specific structure of the image sensor in a circuit 2 for signal collection of the image sensor, reference may be made to the relevant description in FIG. 2.

Specifically, the image sensor may include: a plurality of pixels 13 arranged in an array, a plurality of data lines 11 and a plurality of scanning lines 12. In each column of the pixels 13, each pixel 13 is coupled with the same data line 11 through the pixel switch 131, and in each row of the pixels 13, the pixel switch 131 coupled with each pixel 131 is coupled with the same scanning line 12.

Further, the circuit 2 for signal collection may include: a scanning line control unit 25 coupled with the plurality of scanning lines 12. In each signal collection period, the scanning line control unit 25 controls the plurality of pixels 13 to switch on row by row.

Further, the circuit 2 for signal collection may also include a signal readout unit 26 coupled with the plurality of data lines 11. In each signal collection period, the signal readout unit 26 reads the signal of the switched-on pixel 13 through the data lines 11.

In some embodiments, the signal readout unit 26 can be a signal readout IC.

Further, the circuit 2 for signal collection may also include a bias voltage control unit 27 coupled with the photodiode (i.e. the photosensitive device 132 shown in FIG. 2) of each pixel in the plurality of pixels 13. In each signal collection period, the bias voltage control unit 27 is configured to apply the method for signal collection shown in FIGS. 5 to 7 to apply a forward bias voltage or a reverse bias voltage to the photodiode of each collected pixel 13.

For example, in the reset frame, the bias voltage control unit 27 is configured to control the potential of the common electrode 17 shown in FIG. 2 to change to the potential value V1.

For example, in the first clear frame, the bias voltage control unit 27 is configured to control the potential of the common electrode 17 to change to the potential value V2.

For another example, in the second clear frame and the signal readout frame, the bias voltage control unit 27 is configured to control the potential of the common electrode 17 to change to the potential value V0.

Although the present disclosure has been disclosed above, the present disclosure is not limited thereto. Any changes and modifications may be made by those skilled in the art without departing from the spirit and scope of the present disclosure, and the scope of the present disclosure should be determined by the appended claims.

The invention claimed is:

1. A method for signal collection of an image sensor, the image sensor comprising a plurality of pixels arranged in an array, and each of the plurality of pixels comprising a photodiode, wherein the method for signal collection comprises:
performing signal collection row by row on the plurality of pixels in each signal collection period, wherein the signal collection period comprises at least one reset frame and at least one clear frame;
applying a forward bias voltage to the photodiode of each of the plurality of pixels being collected in each of the at least one reset frame; and
applying a reverse bias voltage to the photodiode of each of the plurality of pixels being collected in each of the at least one clear frame.

2. The method for signal collection according to claim 1, wherein in a same signal collection period, the reverse bias voltage applied to the photodiode in different clear frames has a same or different absolute values.

3. The method for signal collection according to claim 2, wherein the at least one clear frame comprises at least one first clear frame and at least one second clear frame, and an absolute value of the reverse bias voltage applied to the photodiode in each of the at least one first clear frame is greater than the absolute value of the reverse bias voltage applied to the photodiode in each of the at least one second clear frame.

4. The method for signal collection according to claim 3, wherein the at least one first clear frame is prior to the at least one second clear frame in timing sequence in the same signal collection period.

5. The method for signal collection according to claim 3, wherein the absolute value of the reverse bias voltage applied to the photodiode in each of the at least one first clear frame is 1 to 3 times of the absolute value of the reverse bias voltage applied to the photodiode in each of the at least one second clear frame.

6. The method for signal collection according to claim 1, wherein the signal collection period further comprises:
a signal readout frame, wherein a reverse bias voltage is applied to the photodiode of each of the plurality of pixels being collected in the signal readout frame.

7. The method for signal collection according to claim 6, further comprising:
performing signal collection on the plurality of pixels row by row in the signal readout frame, and storing a collected signal value of each photodiode.

8. The method for signal collection according to claim 6, wherein an absolute value of the reverse bias voltage applied to the photodiode in the signal readout frame is not greater than the absolute value of the reverse bias voltage applied to the photodiode in the at least one clear frame.

9. The method for signal collection according to claim 1, wherein performing signal collection on the plurality of pixels in each signal collection period comprises:
discarding a signal value of each photodiode collected in the at least one reset frame and in the at least one clear frame in each signal collection period.

10. The method for signal collection according to claim 1, wherein one end of each photodiode is coupled with a switch device, and the other end of each photodiode is commonly coupled with a common electrode, wherein applying the forward bias voltage to the photodiode includes controlling a potential of the common electrode to be a positive potential, and applying the reverse bias voltage to the photodiode includes controlling the potential of the common electrode to be a negative potential.

11. A circuit for signal collection of an image sensor, the image sensor comprising a plurality of pixels arranged in an array, and a plurality of data lines and a plurality of scanning lines, wherein each of the plurality of pixels in each column is coupled with the same data line through a pixel switch, and the pixel switch coupled with each of the plurality of pixels in each row is coupled with the same scanning line;
wherein the circuit for signal collection comprises:
a scanning line control unit coupled with the plurality of scanning lines and configured to control the plurality of pixels to be switched on row by row in each signal collection period;
a signal readout unit coupled with the plurality of data lines and configured to read an electrical signal of a pixel switched on through the data line in each signal collection period;
wherein the circuit for signal collection further comprises:
a bias voltage control unit coupled with the common electrode, and configured to apply the method for signal collection according to claim 1 to apply a forward bias voltage or a reverse bias voltage to the photodiode of each of the plurality of pixels being collected.

* * * * *